US006899235B2

(12) United States Patent  (10) Patent No.: US 6,899,235 B2
Hassett  (45) Date of Patent: May 31, 2005

(54) ADJUSTABLE MULTIMEDIA STORAGE DEVICE

(75) Inventor: Eric S. Hassett, Golden, CO (US)

(73) Assignee: Case Logic, Inc., Longmont, CO (US)

( * ) Notice: Subject to any disclaimer, the term of this patent is extended or adjusted under 35 U.S.C. 154(b) by 0 days.

(21) Appl. No.: 10/778,638

(22) Filed: Feb. 13, 2004

(65) Prior Publication Data

US 2005/0077256 A1 Apr. 14, 2005

Related U.S. Application Data

(63) Continuation of application No. 29/191,661, filed on Oct. 10, 2003, now Pat. No. Des. 493,326.

(51) Int. Cl.<sup>7</sup> .............................................. A47G 29/00
(52) U.S. Cl. ....................................................... 211/40
(58) Field of Search ....................... 211/40, 41.1, 41.12, 211/41.13, 43, 175, 181.1; D6/407, 465, 629, 630, 478, 479; 206/307, 308.1, 387.14

(56) References Cited

U.S. PATENT DOCUMENTS

| 5,195,642 | A | * | 3/1993 | Dardashti | 211/40 |
| D370,137 | S | * | 5/1996 | David | D6/407 |
| D396,985 | S | * | 8/1998 | Burnett | D6/630 |
| 5,865,320 | A | * | 2/1999 | Hamada | 211/40 |
| D443,791 | S | * | 6/2001 | Martino | D6/630 |
| D462,222 | S | * | 9/2002 | Palmer et al. | D6/630 |
| 6,588,604 | B1 | * | 7/2003 | Tseng | 211/40 |

OTHER PUBLICATIONS

U.S. patent application Ser. No. 29/181,661, Hassett, filed Oct. 10, 2003.
1999 cdProjects Catalog, p. 2.
Case It 2001 Catalog, p. 14.
Case Logic 2000 Ctalog, p. 31.
1999 Case Logic Catalog, p. 23.
1998 Case It Catalog, Modular Tower Stackables.
HFD Supplement, pp. 13, 19 and back cover, Dec. 27, 1993.
2003 Case Logic Catalog, pp. 25.

* cited by examiner

Primary Examiner—Hugh B. Thompson, II
Assistant Examiner—Sarah Purol
(74) Attorney, Agent, or Firm—Sheridan Ross P.C.

(57) ABSTRACT

The present invention is a multimedia storage rack that is adapted to selectively adjust to accommodate different types and sizes of electronic media. More specifically, one embodiment of the present invention is adapted to store a plurality of different sized electronic media such as DVDs, VCR tapes, CDs, mini disks, etc. In order to store larger items, a portion of the rack of one embodiment of the present invention may be selectively dissembled, expanded, and reassembled, thereby providing a larger area for storage.

3 Claims, 5 Drawing Sheets

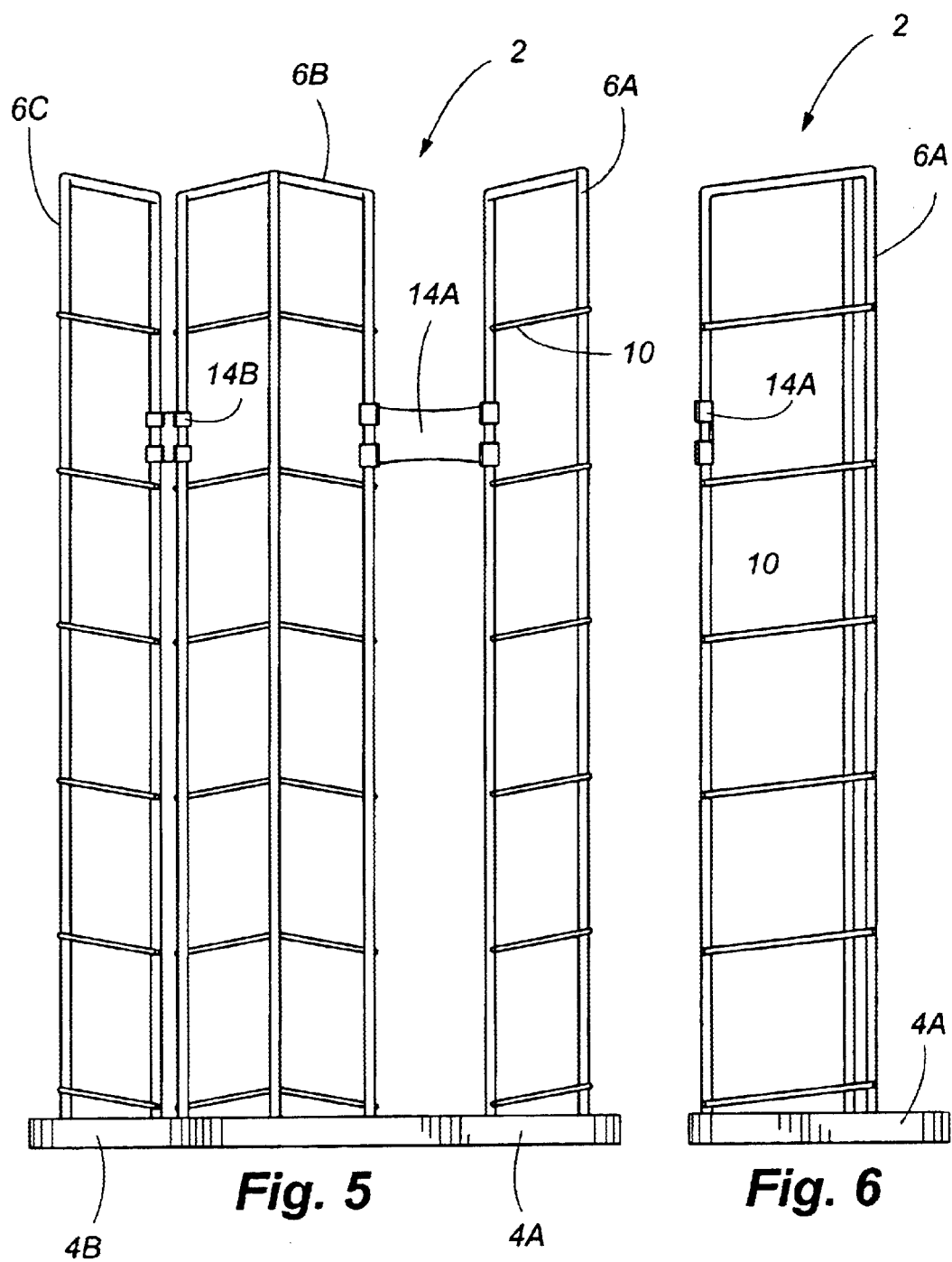

ADJUSTABLE MULTIMEDIA STORAGE DEVICE

This application is a continuation of U.S. patent application Ser. No. 29/191,661, filed Oct. 10, 2003, now U.S. Pat. No. D493,326, which is incorporated herein in its entirety.

FIELD OF THE INVENTION

The present invention is generally related to storage racks, and more specifically devices adapted to support electronic information such as Video Cassette Recorder tapes ("VCR"), floppy discs, Digital Video Discs (DVDs), Compact Discs (CDs), mini discs, phonograph records, 8-track tapes, cassette tapes, laser discs, digital video discs, etc. (hereinafter "electronic media").

BACKGROUND OF THE INVENTION

Storage devices for various types of electronic media have been known since the advent of such electronic media. More specifically, consumers are continuously seeking improved ways to efficiently store and/or sort electronic media. Further, many consumers retain their outdated electronic media due to economic and sentimental reasons, and thus may own various types, sizes, and shapes thereof.

Many storage devices adapted for use with electronic media are known in the art. Often these devices employ rigid, fixed slots that are adapted to receive the electronic media and thus hold it in place. One drawback to storage receptacles employing fixed receptacles is that varying sized electronic media will not all fit in the same storage device. In addition, some storage devices are oriented such that the titles of the electronic media are difficult or impossible to read, thus counterveining one of the very purposes of the storage device.

Thus, there is a long felt need in the field of electronic media storage to provide an adjustable, compact storage device that is adapted to efficiently accommodate various types and sizes of electronic media and thus eliminate the need for multiple storage products.

SUMMARY OF THE INVENTION

It is thus one aspect of the present invention to provide an adjustable storage device that be adapted to receive and store electronic media storage devices, such as VCR tapes, floppy discs, DVDs, CDs, mini discs, phono records, 8-track tapes, cassette tapes, laser discs, digital video discs, etc. ("electronic media"). More specifically, one embodiment of the present invention is adapted to selectively secure a plurality of electronic media such that they may be easily viewed and accessed. This is accomplished by providing a plurality of dividers that are adapted to selectively interface with storage cases that hold many types of electronic media. For example, DVDs and CDs are susceptible to damage by scratching the information surface thereof, thus they are sold and often stored in a protective container, known in the industry as a jewel box. These containers are adapted to open to provide the consumer access to the electronic media, and provide many areas for which to selectively interconnect with a storage case. The present invention provides an adjustable storage device for retaining a plurality of various sizes and shapes of electronic media storage containers, thus facilitating insertion and removal thereof.

Another aspect of the present invention is that the apparatus be structurally stable. More specifically, one embodiment of the present invention is a free-standing tower that resists deflection and that is capable of securely holding a plurality of electronic media without deflection or inadvertent tipping. Preferably, one embodiment of the present invention is constructed of a plurality of base members and rack members that are adapted to support electronic media vertically, thereby creating a smaller footprint for the base. This embodiment offers an efficient storage option because less horizontal space is required for use.

It is yet another aspect of the present invention to provide a storage device that is adapted for selectively storing electronic media of various shapes and sizes. More specifically, one embodiment of the present invention is adapted to allow selective changes in size to accommodate various electronic media storage containers. Preferably, the present invention includes at least two base members, which are adapted to support a plurality of racks. Moreover, each rack includes members that are adapted to support electronic media. In one embodiment of the invention, the electronic media is secured in such a way that the title of the electronic media is easily ascertainable. Preferably, the storage device includes two base members that employ a plurality of apertures that are adapted to securely interconnect to cylindrical protrusions on the racks. The racks are designed to interface perpendicularly to the base members. However, one skilled in the art will appreciate that the orientation of the racks may vary depending on the capabilities of the base to support the loaded frames. In addition, a plurality of brackets may be employed to further ensure stability.

In one embodiment of the present invention, the apparatus is adapted to expand to accommodate larger electronic media by selectively altering the arrangement of the racks. In one embodiment, this adjustment is achieved by utilizing an additional aperture integrated into one of the base members that allows the device to be quickly adjusted without tools. In a related embodiment of the present invention, additional connecting members, which enhance structural stability between the base members, are provided. Preferably, the additional structural support is provided by at least one cylindrical shaped metallic rod that is securely interconnected to one base member and is adapted to selectively interconnect with another base member via a sliding, bearing interface.

It is another aspect of the present invention that the storage apparatus be cost-effective effective to manufacture. More specifically, one embodiment of the present invention is comprised of commonly used materials, such as wood for the base and metal for the rack members. However, any number of materials may be employed to create the present invention, such as plastic, vulcanized rubber, composite material, etc. In addition, depending on the material selection, the rack members may be interconnected to the base members with rigid connections such as fasteners, welds, adhesives, etc., but a removable connection scheme may be more desirable to facilitate storage.

It is yet another aspect of the present invention that the storage apparatus be simplistic to maintain. More specifically, as noted above, one embodiment of the present invention is constructed from a plurality of base and rack members, which are generally easier to clean and repair than receptacle storage devices constructed with plastic, generally in the form of a box that has many nooks and crannies where dirt may be trapped.

Thus, it is one aspect of the present invention to provide an adjustable multimedia storage device comprising:
 a first base having an upper surface, a lower surface, a front edge, a rear edge and lateral edges extending therebetween;

a second base having an upper surface, a lower surface, a front edge, a rear edge, and lateral edges extending therebetween, said second base slidingly engaged to said first base, wherein said storage device has a first and a second position of use;

a first support rack having a first and second leg interconnected to said upper surface of said first base and extending upwardly therefrom, and including a plurality of storage members interconnected to said first leg and said second leg;

a second support rack having a first leg and a second leg interconnected to said upper surface of said second base and extending upwardly therefrom, and including a plurality of storage members interconnected to said first leg and said second leg;

a third support rack having a first leg and a second leg interconnected to an upper surface of said first base, and a third leg interconnected to an upper surface of said second base, said first, second and third legs having a plurality of storage members interconnected thereto;

a first support bracket interconnected to said second leg of said first support rack and said first leg of said third support rack; and a second support bracket interconnected to said third leg of said third support bracket and said second leg of said second support bracket;

wherein in a first position of use said first base and said second base are positioned substantially adjacent one another, and in said second position of use said first base and said second base are pulled apart, wherein said storage space between said second and third storage racks are adjustable.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention.

BRIEF DESCRIPTION OF THE DRAWINGS

FIG. 5 is a rear elevation view of the embodiment of the invention shown in FIG. 1;

FIG. 6 is a left elevation view of the embodiment of the invention shown in FIG. 1;

DETAILED DESCRIPTION

Figures 1, 2:
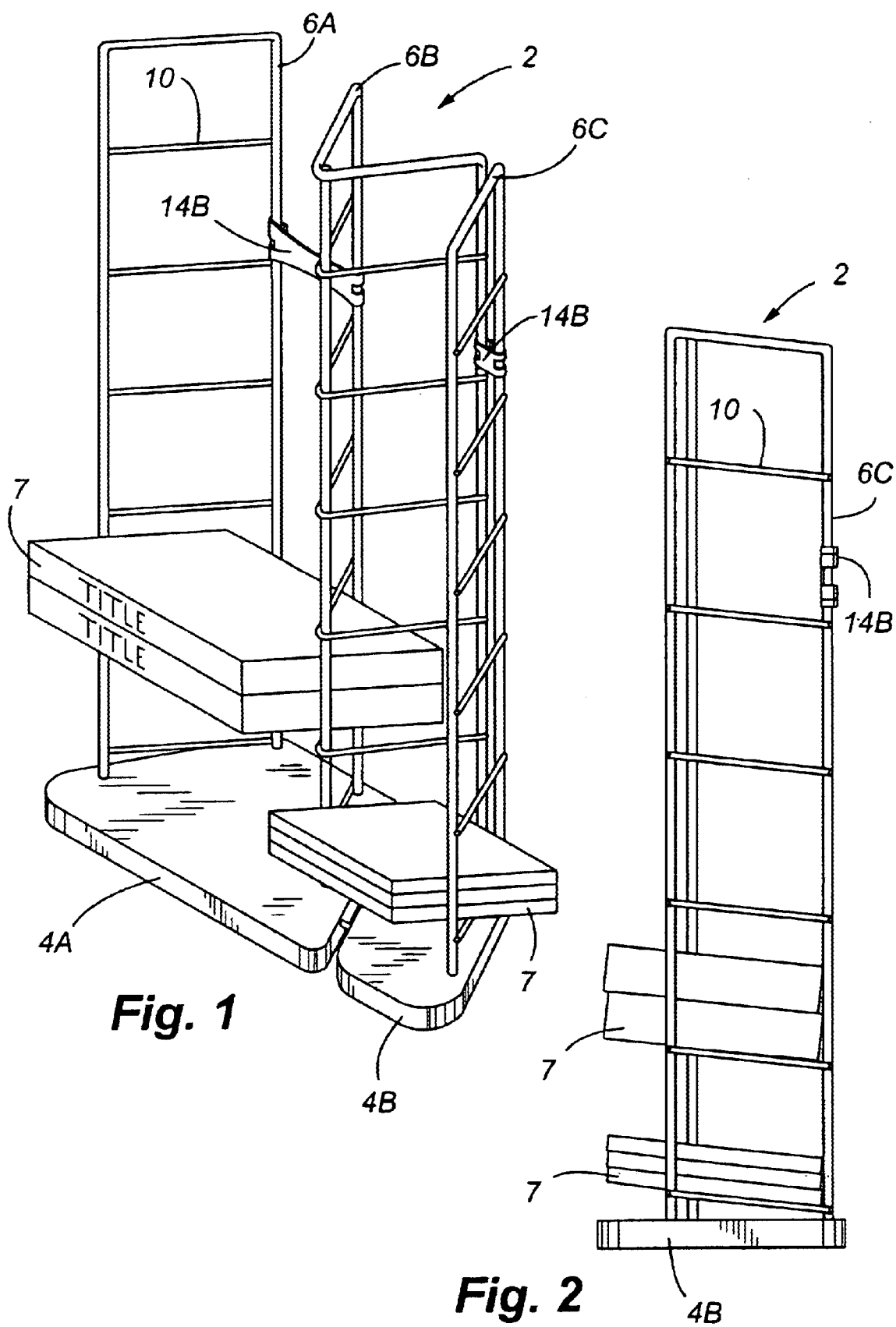
FIG. 1 is a front perspective view of one embodiment of the present invention.
FIG. 2 is a right elevation view of the embodiment of the invention shown in FIG. 1.
Figure 3:
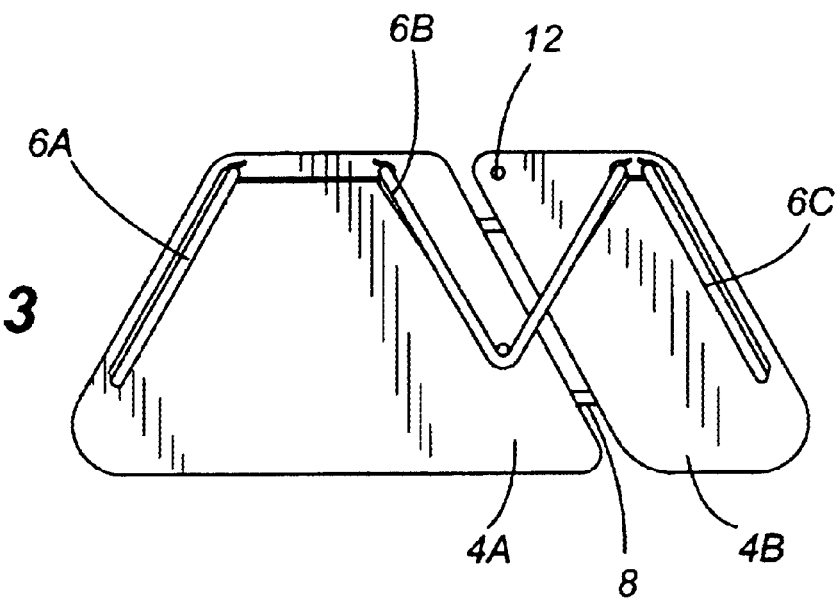
FIG. 3 is a top plan view of the embodiment of the invention shown in FIG. 1.
Figure 7:
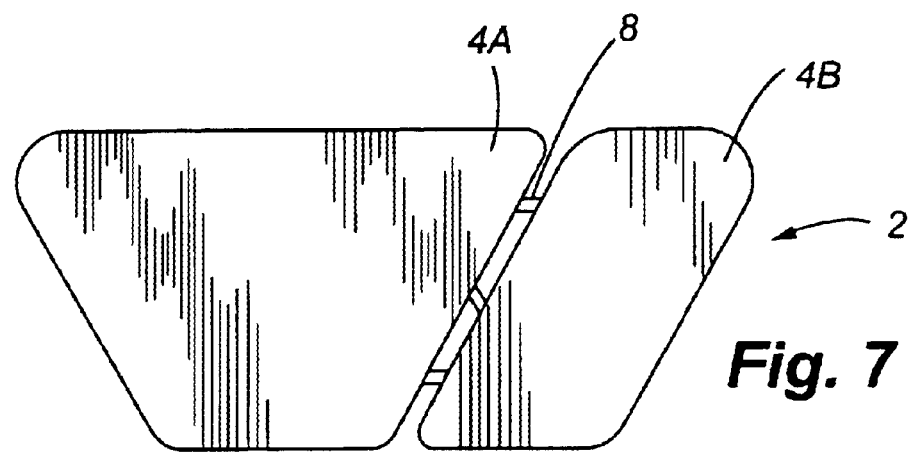
FIG. 7 is a bottom plan view of the embodiment of the invention shown in FIG. 1.
Figure 4:
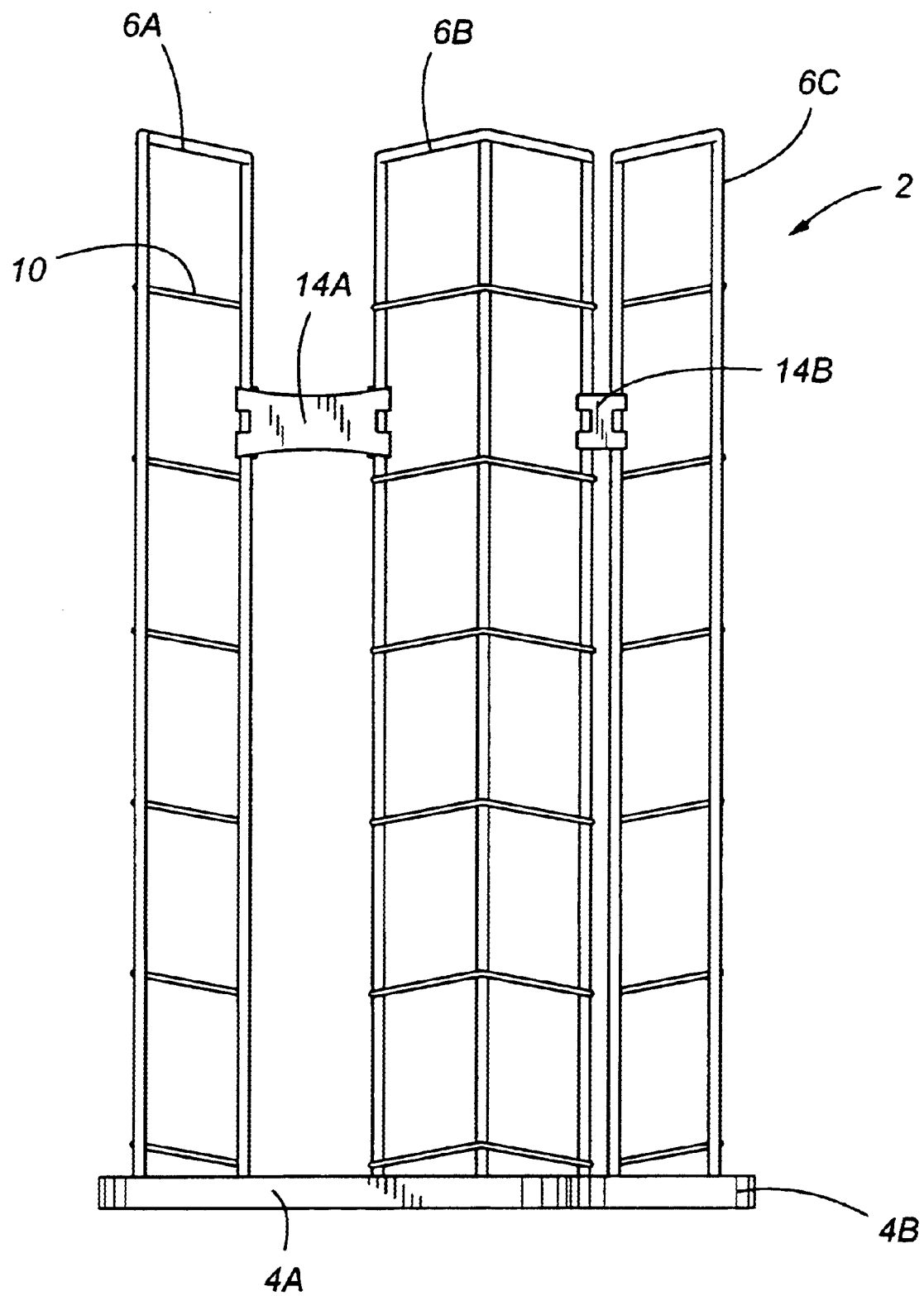
FIG. 4 is a front elevation view of the embodiment of the invention shown in FIG. 1.

Referring now to FIGS. 1–8, an adjustable multi-media storage device 2 is shown herein. One embodiment of the present invention is constructed of a plurality of base members 4 which are interconnected to a plurality of rack members 6 providing a plurality of compartments to store various types of electronic media. In one embodiment of the present invention, the apparatus includes two base members that are selectively interconnected to each other with connecting members that allow the two base members to slide with respect to each other, thus increasing or decreasing the size of base footprint, depending on the size of electronic media to be stored. The vertically positioned racks, which are defined by a plurality of generally cylindrical metal members that are interconnected by support members 10 to enhance their stability and strength, are adapted for selective interconnection with the base members. These support members also act as locations that are adapted to store various types of electronic media such as CDs, DVDs, VHS tapes, etc. Preferably, the interconnection between the racks 6 and the base members 4 is achieved by way of apertures integrated into the base members, that are adapted to receive the metal members of the racks 6, thus providing sufficient support to maintain the vertical orientation of the racks 6. If a user wishes to change the footprint of the base members 4, thereby providing additional space to store larger electronic media, such as additional DVDs as opposed to CDs, the base members 4 may be extended with respect to each other, thereby spreading the support members 10 to the desired length.

Referring now to FIGS. 1–7, the storage device 2 of the present invention is shown herein. More specifically, the storage device 2 is generally constructed of base members 4, which are selectively interconnected to storage racks 6, wherein sufficient locations are provided that are adapted to store a plurality of electronic media 7. In one embodiment, the plurality of base members 4 are preferably comprised of wood, however many other materials, as mentioned above, may be used to provide sufficient support for which to constrain the rack members 6. As shown here, the base members 4 are generally trapezoidal shaped pieces of material that are positioned proximate to each other and connected to each other with connecting rod members 8, which are generally constructed of metal. The rack members 6 are generally made of a metal material that are interconnected by metallic support members 10 that provide horizontal support for electronic media storage cases. The racks 6 are adapted for selective interconnection to the base members 4 by sliding the ends of the racks into apertures 12 provided in the base members 4. In addition, a plurality of brackets 14 may be provided to enhance the structural stability of the racks 6 with respect to each other.

Although the base members 4 are preferably interconnected with connecting members 8 that are adapted to allow a sliding interconnection therebetween, one skilled in the art will appreciate that such members are generally not required: However, they do provide additional structural stability. Furthermore, as shown in the figures, the base is made of two separate base members 4, however, any number of base members 4 may be employed to achieve the functional attributes of the present invention. More specifically, one skilled in the art will appreciate that any number of base members 4 and any variety of shapes may be employed to provide various amounts of storage area for a plurality of different types of electronic media 7.

Figure 8:
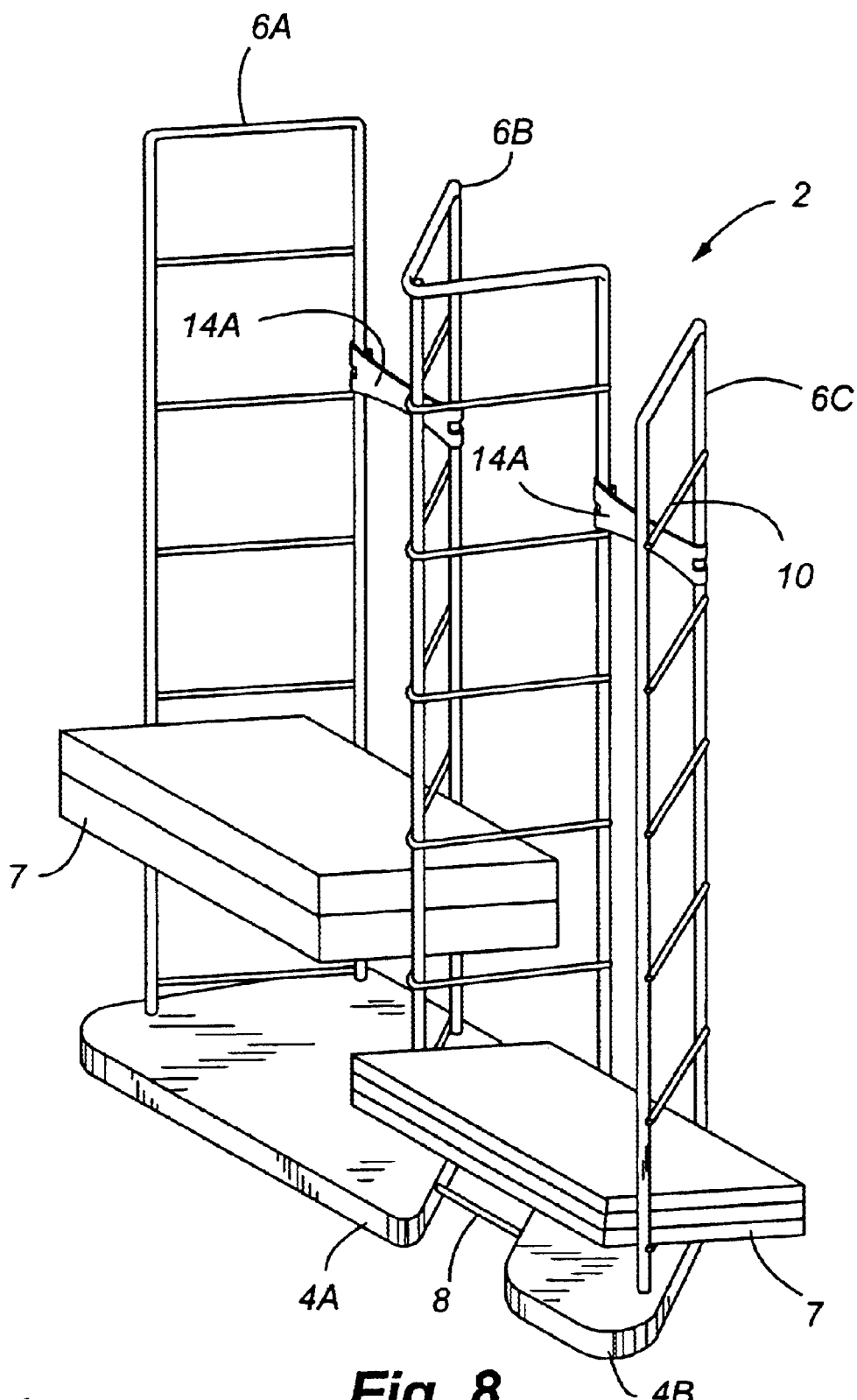
FIG. 8 is a front perspective view of the embodiment of the invention shown in FIG. 1, in a second, extended orientation, wherein a base member has been adjusted to provide accommodation for larger electronic media.

Referring now to FIG. 8, a description on the adjustment mechanism is described herein. One embodiment of the present invention is adapted to hold up to 36 DVDs and 54 CDs. More specifically, in one embodiment of the invention one side of the rack is provided with larger support spans to accommodate larger electronic media storage cases 7, whereas the other side is smaller such that smaller electronic media storage cases 7 such as CDs may be stored efficiently. Further, the present invention is adapted to expand to facilitate storing up to 72 DVDs, wherein the 54 CDs would be removed and the base members 4 separated, such that a greater area is provided to store the additional 36 DVDs.

Generally, as shown in the figures, a rack of the present invention is constructed of a large base member 4A and a smaller base member 4B which are interconnected to three rack members 6. Preferably, in one embodiment of the present invention, there are three rack members, a left rack member 6A, a middle rack member 6B and a right rack member 6C, wherein the middle rack member 6B is actually formed of two separate rack members that are interconnected to form a "v"-shape as viewed from above. The rack members 6 provide interconnection locations for a plurality of support members 10 that are adapted to hold electronic media 7. In order to provide enhanced readability of the electronic media, the support 10 members may be tilted at an angle relative to horizontal, such that the electronic media 7 is angled slightly upward, thereby providing easy viewing. As mentioned briefly above, a plurality of brackets 14 maybe employed to enhance the stability of the racks 6 with respect to each other. As shown, a long bracket 14A may be used to support the portion of the storage device 2 that is adapted to hold larger electronic media items, wherein a smaller bracket 14B is used to tie the two racks 6 together that are adapted to hold smaller electronic media items.

In order to adjust the size of the smaller portion to make it adaptable to accommodate larger electronic media items, a user initially disconnects the smaller bracket 14B, and disconnects one of the legs of the middle rack 6B from the aperture 12 in smaller base member 4B. The right rack 6C and the smaller base member 4B are then free to expand relative to the larger base member 4A. Next, the middle rack 6B is again interconnected to the smaller base member 4B via an additional aperture 12 in the base member 4B, thereby providing a larger area for storage. Finally, a larger bracket 14A is used to interconnect the middle 6B rack and right 6C rack members. As shown herein, an additional aperture 12 is provided to accommodate the movement of the base members 4, and thus provide sufficient securing locations for the racks 6.

However, as appreciated by one skilled in the art, other means may be used to provide adjustability to the storage device 2 without the use of an aperture 12 as shown. For example, a slot may be used wherein no disconnections are required, that is no removal of the middle rack 6B would be required. In addition, as shown herein, the middle support rack 6B is shown as a one piece member. However, one skilled in the art will appreciate that this member can be separated into two or more pieces to facilitate transportation and provide a smaller storage area. Also, one skilled in the art will appreciate that the vertical length of the storage device 2 may be any height as long as the base members 4 are capable of structurally supporting the accompanying weight of the electronic media 7 and the racks 6.

To assist in the understanding of the present invention the following list of components and associated numbering found in the drawings is provided herein:

| # | Component |
|---|---|
| 4 | Base member |
| 4A | Large Base Member |
| 4B | Small Base Member |
| 6 | Rack Member |
| 6A | Left Rack |
| 6B | Middle Rack |
| 6C | Right Rack |
| 7 | Electronic media |
| 8 | Connecting Members |
| 10 | Support Members |
| 12 | Aperture |
| 14 | Bracket |
| 14A | Large Bracket |
| 14B | Small Bracket |

While various embodiment of the present invention have been described in detail, it is apparent that modifications and adaptations of those embodiments will occur to those skilled in the art. However, it is to be expressly understood that such modifications and adaptations are within the scope and spirit of the present invention, as set forth in the following claims.

What is claimed is:

1. An adjustable multimedia storage device adapted for holding at least two distinct sizes of electronic media, comprising:

a first base having an upper surface, a lower surface, a front edge, a rear edge and lateral edges extending therebetween;

a second base having an upper surface, a lower surface, a front edge, a rear edge, and lateral edges extending therebetween, said second base slidingly engaged to said first base, wherein said storage device has a first and a second position of use;

a first support rack having a first leg and a second leg interconnected to said upper surface of said first base along a left lateral edge, and extending upwardly therefrom, and including a plurality of substantially horizontal support members interconnected to said first leg and said second leg;

a second support rack having a first leg and a second leg interconnected to said upper surface of said second base along a right lateral edge, and extending upwardly therefrom, and including a plurality of substantially horizontal support members interconnected to said first leg and said second leg;

a third support rack having a first leg and a second leg interconnected to an upper surface of said first base, and a third leg interconnected to an upper surface of said second base, said first, second and third legs having a plurality of substantially horizontal support members interconnected thereto; and wherein in a first position of use said first base and said second base are positioned substantially adjacent one another, and in said second position of use said first base and said second base are pulled apart, wherein said storage space between said second and third storage racks are adjustable.

2. The storage device of claim 1, further comprising a first support bracket interconnected to said second leg of said first support rack and said first leg of said third support rack.

3. The storage device of claim 1, further comprising a second support bracket interconnected to said third leg of said third support bracket and said second leg of said second support bracket.

* * * * *